United States Patent [19]

Giorcelli

[11] 4,030,074
[45] June 14, 1977

[54] SYSTEM FOR CHECKING TWO DATA PROCESSORS OPERATING IN PARALLEL

[75] Inventor: Silvano Giorcelli, Turin, Italy

[73] Assignee: Centro Studi e Laboratori Telecomunicazioni, Turin, Italy

[22] Filed: June 3, 1975

[21] Appl. No.: 583,250

[30] Foreign Application Priority Data

June 3, 1974 Italy .................................. 68735/74

[52] U.S. Cl. ........................ 364/200; 235/153 AE
[51] Int. Cl.² .................. G06F 11/08; G06F 15/00
[58] Field of Search ................ 340/172.5; 235/153; 445/1

[56] References Cited

UNITED STATES PATENTS

| | | | |
|---|---|---|---|
| 3,409,879 | 11/1968 | Keister | 340/172.5 |
| 3,503,048 | 3/1970 | Avsan et al. | 340/172.5 |
| 3,533,082 | 10/1970 | Schnabel et al. | 340/172.5 |
| 3,668,644 | 6/1972 | Looschen | 340/172.5 |
| 3,784,983 | 1/1974 | Eckert et al. | 340/172.5 |
| 3,786,430 | 1/1974 | Hajdu et al. | 340/172.5 |

Primary Examiner—Mark E. Nusbaum
Attorney, Agent, or Firm—Karl F. Ross; Herbert Dubno

[57] ABSTRACT

Two substantially identical data processors, operating in parallel, include each a general-purpose computer and an associated data store connected to each other by way of a respective logic network, the two networks being substantially identical and intercommunicating for recurrent comparisons of their settings. Each network includes a buffer memory for the temporary inscription of addresses in the corresponding data store together with data words to be read out of and into that store at the inscribed addresses, as well as a pair of counters respectively keeping track of the successive operating cycles initiated by computer instructions and of the checks performed on the results of these operations. Detection of a disparity by a comparator in either network results in a regression of the cycle counter to a preceding cycle which checked out correctly, with reintroduction of an earlier word from the buffer memory into the data store if the cancelled operation involved a writing step.

9 Claims, 3 Drawing Figures

SYSTEM FOR CHECKING TWO DATA PROCESSORS OPERATING IN PARALLEL

FIELD OF THE INVENTION

My present invention relates to a system for the checking of two substantially identical data processors operating in parallel, each processor including a general-purpose computer and an associated data store.

BACKGROUND OF THE INVENTION

In telecommunication systems, for example, data processors intervening in the establishment and eventual termination of a connection are frequently duplicated in order to prevent interruption of service if one processor should fail. The two processors, in normal operation, simultaneously perform a succession of operating cycles which may be considered steps of a macroprogram involving a series of instructions, each instruction relating to the reading of a data word at a specified address in the data store or the writing of a new data word in place of an old one at such address.

For proper performance it is necessary to check from time to time, preferably during every cycle, the operations of the two data processors in order to ascertain whether they are progressing identically or not. Prior checking systems of this character utilize special-purpose equipment which, because of its limited field of use, is expensive as to both the hardware and the software employed.

OBJECT OF THE INVENTION

The object of my present invention, therefore, is to provide an improved checking system universally applicable to all data processors of the character described above.

SUMMARY OF THE INVENTION

This object is realized, in accordance with my present invention, by the provision of a pair of substantially identical logic networks each inserted between the computer and the data store of a respective data processor in a pair of such processors to be supervised, each logic network including memory means for the temporary registration of data called forth from and destined for the corresponding data store as well as transfer means independent of the memory means for the transmission of data words from the computer to the data store and vice versa. With the aid of comparison means, preferably including a pair of comparators individual to the two networks, the equality of information respectively registered in their memory means is ascertained upon enablement of the comparison means at the end of an operating cycle; a feedback circuit, extending from the comparison means to the computers of the two data processors, causes a reversion to an earlier operating cycle upon ascertainment of a mismatch between the contents of the respective memory means of the two networks transmitted to the comparison means.

According to a more specific feature of my invention, each logic network comprises a first counter for the successive operating cycles and a second counter for successive checking operations, these counters having output connections which extend to the comparison means for initiating a checking operation whenever the count of the first counter, i.e. the number of completed operating cycles, exceeds that of the second counter, i.e. the number of checking operations already performed.

The first counter may have input means for reducing its count by one step in response to a mismatch detected by the comparison means, thereby reverting to the immediately preceding operating cycle for the purpose of retesting. If a mismatch is detected in an operating cycle involving the writing of a new data word in the data store, such a reversion requires the reintroduction into that store of the old word just replaced by the new one. It is thus necessary to preserve the old data word for at least one cycle; this may be accomplished, pursuant to a further feature of my invention, by designing the memory means of each logic network as a buffer memory with a multiplicity of stages (one for each cycle of the macroprogram) each subdivided into a plurality of sections including a first section for an address code, a second section for a new data word to be written in the store at the location indicated by the address code, and a third section for the old word to be superseded at that address by the new one.

The transfer of data between the computer and the store may be carried out with the aid of register means, such as a data register and an address register, connected in parallel with the buffer memory between first bus-connector means for incoming code words and second bus-connector means for outgoing code words, each bus-connector means advantageously comprising a plurality of conductors for the parallel loading and unloading of register and memory cells via corresponding gating circuits. According to a further feature of my invention, these gating circuits are controlled by microprogramming means responding to a macroinstruction from the corresponding computer to establish successive phases of an operating cycle; two separate but substantially identical microprogrammers may be provided for this purpose in respective portions of the logic network associated with each computer, i.e. in a first portion controlling signal transmission between the computer and the data store and in a second portion controlling signal transmission between the two networks. If the comparison means includes an individual comparator in each network, the second portion of one network may respond to the initiation of a checking operation by that network with the emission of an inhibiting signal to the other network for blocking the comparator thereof as long as checking is in progress.

BRIEF DESCRIPTION OF THE DRAWING

The above and other features of my invention will now be described in detail with reference to the accompanying drawing in which.

SPECIFIC DESCRIPTION

Figure 1:
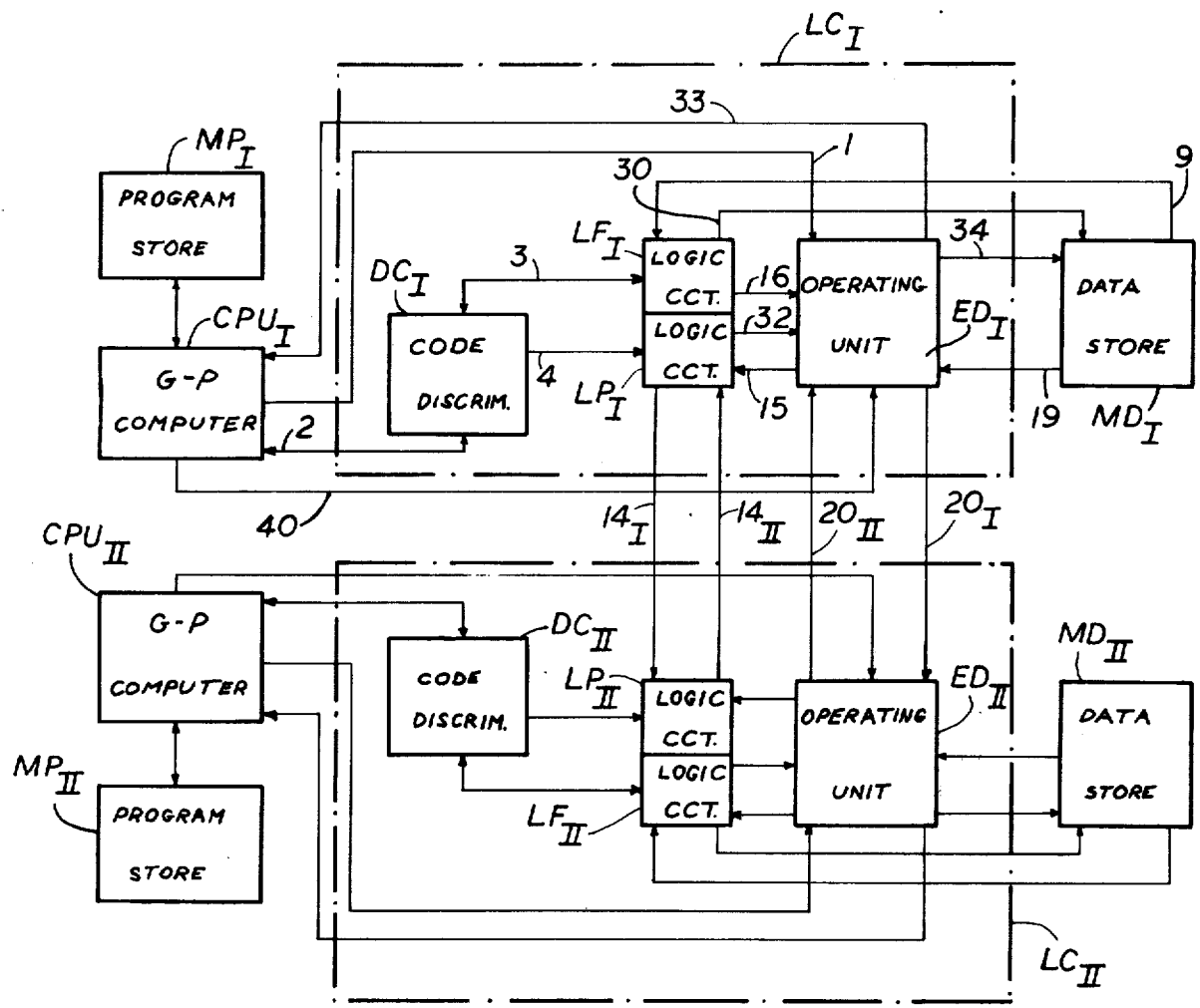
FIG. 1 is an overall block diagram of a data-processing system embodying my invention.

The system shown in FIG. 1 comprises two identical halves whose components are distinguished from each other by subscripts I and II. One of these halves includes a general-purpose computer $CPU_I$ provided with the usual program store $MP_I$ and an associated data store $MD_I$ separated from the computer by a logic network $LC_I$. The other half analogously includes a computer $CPU_{II}$ with program store $MP_{II}$, data store $MD_{II}$ and interposed logic network $LC_{II}$.

Network $LC_I$ comprises two logic circuits $LF_I$ and $LP_I$, a code discriminator $DC_I$ and an operating unit $ED_I$; network $LC_{II}$, similarly, comprises logic circuits $LF_{II}$ and $LP_{II}$, an operating unit $ED_{II}$ and a code discriminator $DC_{II}$.

The connections between either computer and the corresponding data store, as particularly illustrated for the upper half of the system of FIG. 1, includes a number of conductors 1 – 4, 9, $14_I$, 15, 16, 19, $20_I$, $20_{II}$, 30, 32 – 34 and 40 more fully described hereinafter with reference to FIG. 3. Each of these conductors may comprise a group of parallel leads, some of which have been given individual designations in FIGS. 2 and 3. It should be noted that leads $14_I$ and $20_I$ serve for the transmission of signals from components $LP_I$ and $ED_I$ in the upper half to their respective counterparts $LP_{II}$ and $ED_{II}$ in the lower half whereas lead $14_{II}$ and $20_{II}$ are effective in the opposite direction.

Figure 2:
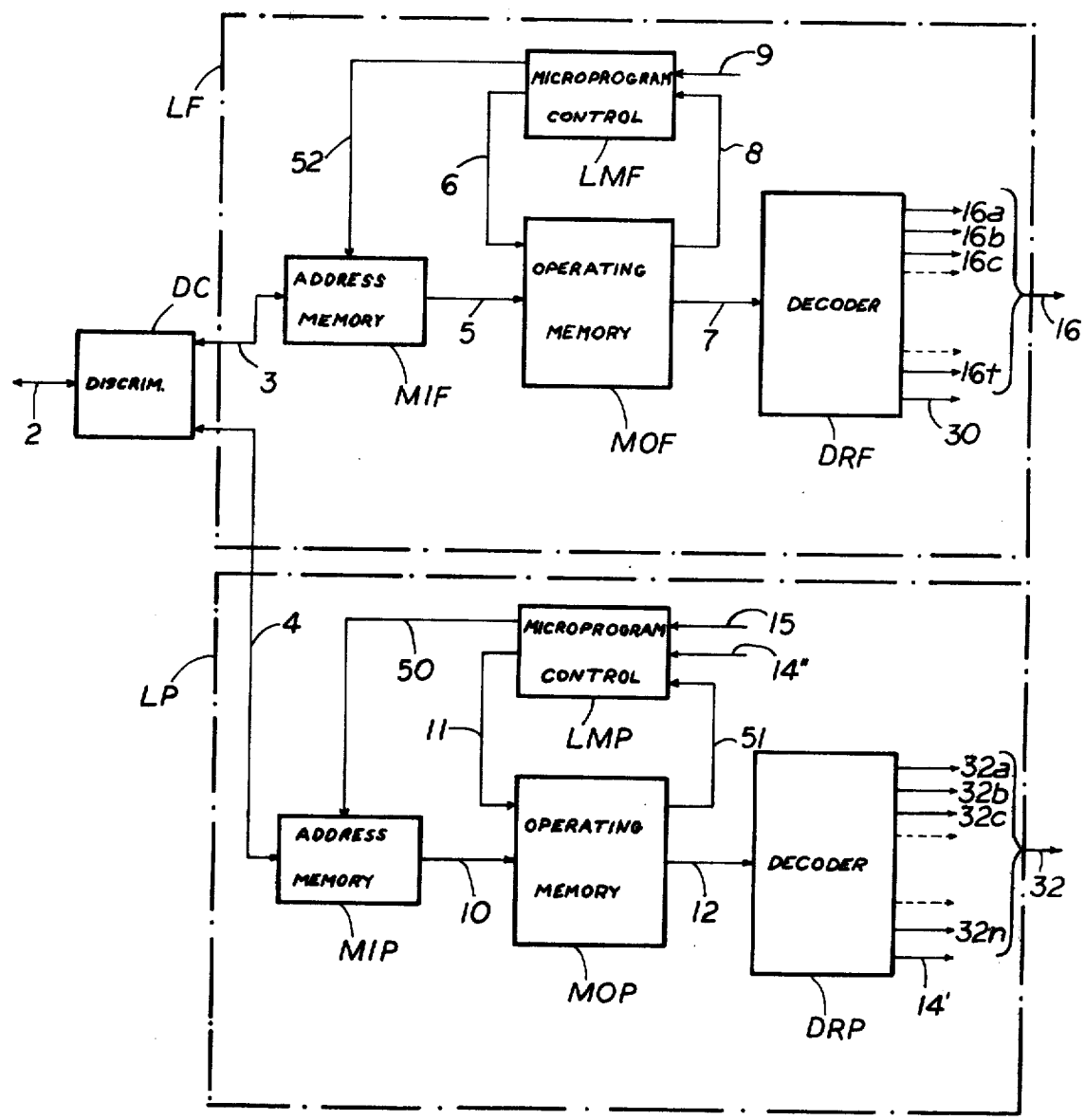
FIG. 2 is a more detailed block diagram of a logic network forming part of the system of FIG. 1.

In FIG. 2 I have shown components of either of the two halves of FIG. 1, referred to hereinabove as data processors, with omission of subscripts I and II. Logic circuits LF and LP are seen to be of substantially identical structure, comprising respective address memories MIF, MIP and operating memories MOF, MOP of the read-only type, microprogram-control units LMF, LMP linked with memories MOF AND MOP via leads 6, 8 and 11, 51, respectively, and decoders DRF, DRP working into conductor multiples 16 and 32, respectively. Code discriminator DC (essentially a deccoder), linked with its associate computer by way of lead 2, is connected to address memories MIF and MIP via leads 3 and 4, respectively. The input and output connections of memories MOF and MOP have been designated 5, 7 and 10, 12. Leads 30 and 14' extend from the outputs of decoders DRF and DRP, respectively, lead 14' being representative of the outgoing conductor $14_I$ (FIG. 1) in the case of network $LC_I$ or $14_{II}$ in the case of network $LC_{II}$. The corresponding incoming lead 14" (i.e. conductor $14_{II}$ in the case of network $LC_I$ in FIG. 1) terminates together with lead 15 at control circuit LMP; lead 9, extending from the associated data store ($MD_I$ or $MD_{II}$), terminates at control circuit LMF. A feedback connection 50 extends from control circuit LMP to address memory MIP for the readout of an alarm condition to the corresponding computer as more fully described hereinafter; a similar connection 52 extends from circuit LMF to memory MIF.

Figure 3:
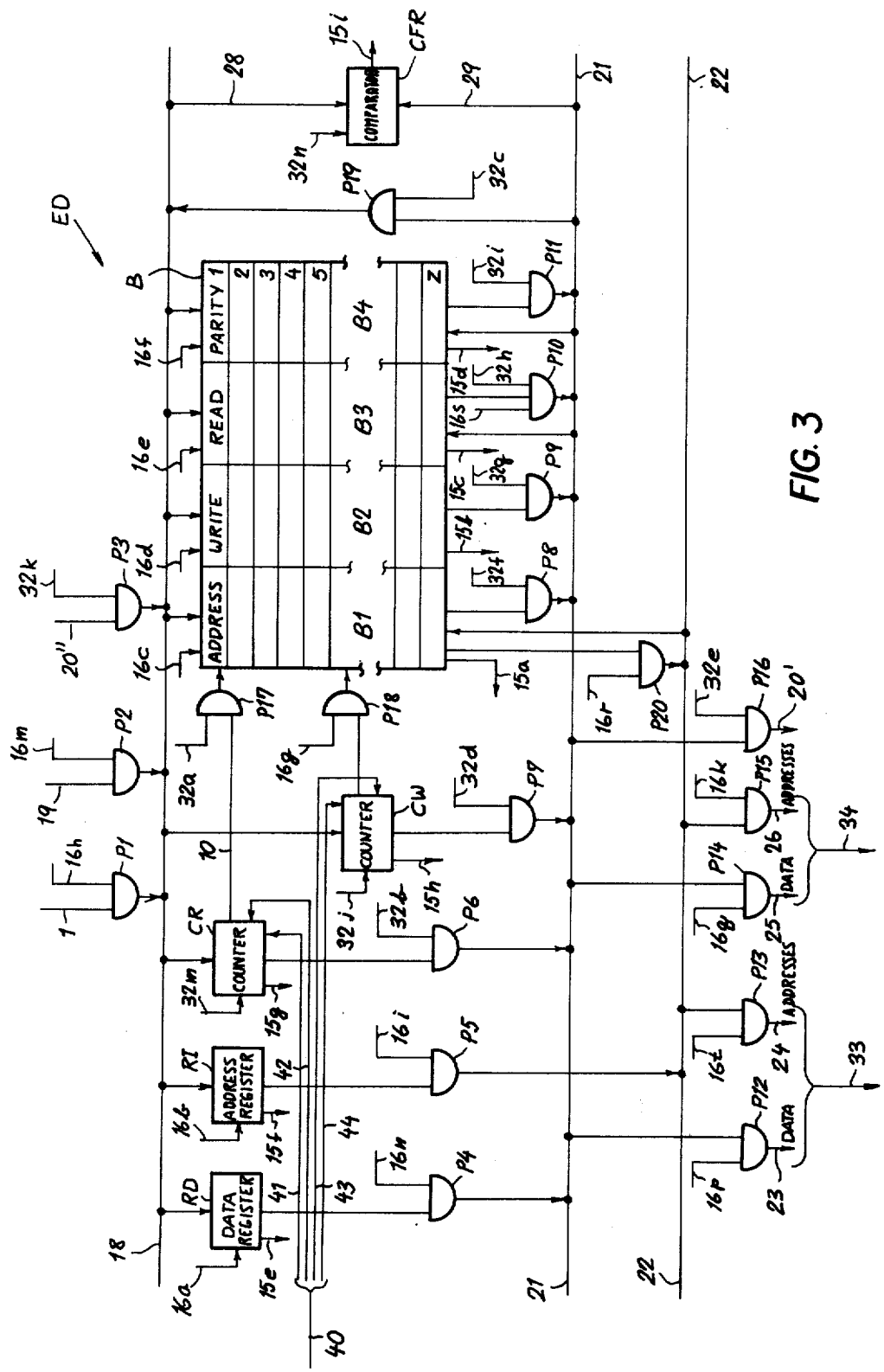
FIG. 3 is a still more detailed circuit diagram of an operating unit included in the system of FIG. 1.

Reference will now be made to FIG. 3 for a more detailed description of an operating unit ED representative of either of the two identical units $ED_I$ and $ED_{II}$ of FIG. 1. This unit comprises a first counter CW, a second counter CR, a data register RD, an address register RI, a digital comparator CFR, a buffer memory B with z stages divided into four multibit sections B1 – B4, and a set of AND gates P1 – P20 any of which may consist of a plurality of such gates connected in parallel. Memory B could consist of semiconductive or ferromagentic storage elements, for example, arranged in an orthogonal matrix.

Gates P1 – P3 work into a bus connector 18 for incoming signals; outgoing signals appear on two other bus connectors 21, 22 for delivery to the associated computer via multiple 33, to the associated data store via conductor multiple 34, or to the companion unit of the other logic network via outgoing lead 20' whose incoming counterpart 20" terminates at gate P3. Data register RD lies between connectors 18 and 21, in series with gate P4; address register RI similarly lies between connectors 18 and 22, in series with gate P5. Counters CR and CW have inputs joined to connector 18 and outputs working into connector 21 by way of gates P6 and P7.

Buffer memory B lies between input connector 18 and output connectors 21, 22 in parallel with registers RD and RI. More particularly, its sections B1 – B4 work into connector 21 by way of gate P8 – P11, respectively, a further output lead from section B1 passing through gate P20 to connector 22. Via gates P17 and P18, counters CR and CW identify successive memory stages for checking and loading, respectively. Comparator CFR has two inputs 28, 29 respectively tied to connectors 18 and 21. Gate P19 serves for the transfer of signals from connector 21 back to connector 18 for delivery to one of these comparator inputs, i.e. lead 28.

Memory sections B1 – B4, registers RD and RI, counters CR and CW, and comparator CFR are provided with respective output leads $15a$ – $15i$ all forming part of the multiple 15 shown in FIG. 2. Mutiple 16, originating at decoder DRF in FIG. 2, consists of control leads $16a$ – $16t$ whose function will be described hereinafter; similarly, multiple 32 originating at decoder DRP consists of leads $32a$ – $32n$. Gates P1 and P2 receive signals from the associated computer via lead 1 and from the associated data store via lead 19, respectively. Multiple 33 includes leads 23 and 24 carrying data and address words, respectively, from gates P12 and P13; in a similar manner, leads 25 and 26 forming part of conductor multiple 34 carry data and address words from gates P14 and P15.

The general mode of operation of the system shown in the drawing is as follows:

Computers $CPU_I$ and $CPU_{II}$ are conventionally controlled by their program stores $MP_I$, $MP_{II}$ to carry out, substantially simultaneously, successive operating cycles of a macroprogram involving the transmission of instructions via leads 1 and 2 to the associated logic network $LC_I$ or $LC_{II}$. Depending on the nature of the signal code on lead 2, e.g. on the presence or absence of a certain bit therein, the corresponding discriminator DC energizes lead 3 or lead 4 to read an address from memory MIF or MIP via lead 5 or 10 into memory MOF or MOP to start a microprogram sequence. Each microinstruction on output lead 7 or 12 is accompanied by a signal on lead 8 or 51 to controller LMF or LMP to advance the microprogram. In the case of controller LMF, the advance is authorized by a signal on lead 9 from the associated data store, indicating that the reading or writing of a word from or into that store has been completed, whereas in the case of controller LMP the advance depends on the energization of multiple 15 (to indicate proper operation of the corresponding circuit elements of FIG. 3) and the absence of an inhibiting signal on lead 14" originating at the companion network.

Discriminator DC distinguishes between macroinstructions relating to the transfer of data between the computer $CPU_I$ (or $CPU_{II}$) and the corresponding data store $MD_1$ (or $MD_{II}$), on the one hand, and those concerning the checking operations, involving the readout of words inscribed in buffer memory B during the immediately preceding data transfer. Thus, each operating cycle may be considered divided into a transfer part and a checking part.

At the beginning of a macroprogram, the computer energizes leads 42 and 43 of multiple 40 to reset the counters CR and CW. Other leads 41 and 44 of this multiple serve to advance the counters by one step after each completed transfer and checking operation, respectively.

If the checking operation reveals no error, the macroprogram continues without interruption. If, however, a mismatch is detected between the contents of corresponding stages and sections of the buffer memories B of logic networks $LC_I$ and $LC_{II}$, a signal fed back from the active comparator CFR via lead 15$i$ energizes the output lead 50 of control circuit LMP whereupon memory MIP informs the computer via two-way connection 4 that an alarm condition exists. The computer then restarts the cycle and re-emits its operating and checking instructions. Upon repeated failure, conventional tests such as parity checks (see below) are automatically initiated to determine the defective processor and to eliminate it from the system, with or without substitution of an alternate.

If the cycle to be repeated includes a writing instruction, i.e. the substitution of a new data word for an old one at a designated location of each data store $MD_I$, $MD_{II}$, then a return to the preceding state requires the reintroduction of the old word at that location. Memory B, therefore, is designated to receive in its first section B1 the address of a data word to be read or written, in its second section B2 the new word (if any) to be written at that address, and in its third section B3 the old word read out from that address. The fourth memory section B4 serves for the usual parity checks which, in a conventional manner not relevant to the invention and therefore not further described, determine whether there are any flaws in the operation of the system unrelated to the parallel performances of the two processors.

I shall now describe two typical program cycles, i.e. one involving reading of a data word from stores $MD_I$, $MD_{II}$ and one involving the writing of a data word in these stores.

Reading Cycle

If this cycle happens to be the first one in the microprogram, counters CR and CW are in their starting position and identify the first stage of memory B, i.e. row No. 1.

A macroinstruction "read data store," routed by discriminator DC from lead 2 onto lead 3, reaches the upper portion LF of each network to extract from the address memory MIF thereof a signal which, when transmitted to operating memory MOF via lead 5, activates a reading microprogram. In the first phase of this microprogram, a microinstruction on conductor 7 is translated by decoder DRF into an energization of lead 16$h$ which opens the gate P1 for the passage of an address code, emitted by the computer over lead 1, to connector 18. On lead 8, memory MOF signals the controller LMF to advance the sequence to the next phase by a stepping pulse on lead 6.

Memory MOF now emits a code which energizes the leads 16$b$, 16$c$ and 16$g$ in addition to lead 16$h$, thereby loading the address register RI with the code still present on connector 18, giving access to memory section B1 for inscription of the same address code therein, and unblocking the gate P18 to identify row No. 1 as the memory stage to be used for this purpose, pursuant to the setting of counter CW.

The next phase in the microprogram results in the de-energization of lead 16$h$ with consequent closure of gate P1, accompanied by the energization of leads 16$i$ and 16$k$ whereby the contents of address register RI are transmitted through gates P5 and P15 via connector 22 and lead 26 of multiple 34 to the associated data store.

In the fourth phase, that store is activated by a signal on lead 30 (FIG. 2) to read out a data word from a location identified by the address code on lead 26, further stepping of memory MOF by controller LMF being prevented by a signal on lead 9 during the search for the data word.

When the store is ready to transmit, the fifth phase of the microprogram energizes the lead 16$m$ to open the gate P2 whereupon the data word appears on connector 18.

In response to the sixth microinstruction, the simultaneous energization of leads 16$a$ and 16$e$ loads the data word into register RD and the No. 1 row of memory section B3, gate P18 being still open by virtue of the continuing energization of lead 16$g$.

At this point the reading microprogram is terminated and the computer, informed of this fact by a signal on lead 52 and resulting transmission of a code from memory MIF via leads 3 and 2, energizes the lead 44 to advance the counter CW while all leads in the output of decoder DRF are de-energized.

The computer now emits a further macroinstruction "read register" which, via leads 2 and 3 as well as memories MIF and MOF, energizes leads 16$n$ and 16$p$ in the output of decoder DRF to open the gates P4 and P12 whereby the data word previously loaded into register RD is transferred via connector 21 and lead 23 of multiple 33 to the computer for further processing. At the same time, decoder DRF also energizes the leads 16$i$ and 16$t$ for a transfer of the address code from register RI via gates P5 and P13 as well as lead 24 of multiple 33 to the computer.

With the transfer part of this operating cycle thus concluded, each computer presets the operating memory MOP of the associated logic network for a possible checking operation. Memory MOP, via lead 12 and decoder DRP, energizes first the leads 32$b$ and 32$c$ of output multiple 32, thereby unblocking the gates P6 and P19 to feed the setting of counter CR via connector 21 and lead 28 to a storage circuit (not shown) in one of the inputs of comparator CFR and then, upon reblocking of these gates, energizes the lead 32$d$ of the same multiple for feeding the setting of counter CW via gate P7, connector 21 and lead 29 to the other comparator input. Under the assumed conditions the counter CR is still in its starting position whereas the counter CW has already taken one step; the two counts, therefore, are unequal and the comparator CFR energizes its output lead 15$i$ in response to an enabling signal on lead 32$n$. The disparity signal on lead 15$i$, along with signals on the other leads of multiple 15 indicating the static condition of their respective components, now triggers the controller LMP to start a checking microprogram progessing similarly to the reading microprogram described above.

The first microinstruction from memory MOP, forming part of this checking microprogram, energizes the lead 14' extending to logic circuit LP of the companion network, thereby transmitting to that network a request signal for the initation of a checking operation. In view of the substantially synchronous and normally identical modes of operation of the two networks, a similar request signal is sent about the same time from that other network to the first-mentioned one. In principle, either network may perform the requested checking operation; in the present instance, the network first to receive a request signal on its incoming lead 14" is the one which first performs the check to the exclusion of the other network. The latter network, in its temporary slave role, is constrained to carry out certain ancillary operations under the command of the performing or master network; by way of example it will be assumed that network $LC_I$ is the master and $LC_{II}$ is the slave.

In the first phase of the checking operation, logic circuit $LF_I$ energizes its output leads 32b and 32e for transmitting the setting of its counter CR via gates P6 and P16 over lead $20_I$ to the gate P3 of operating unit $ED_{II}$. The energization of leads 32k and 32m in that operating unit loads the counter CR thereof with the setting of its mate in unit $ED_I$ to insure that the tests are carried out on corresponding stages of the respective buffer memories B. The continuing energization of leads $14_I$ and $14_{II}$ constitutes an inhibition and a confirmation signal, respectively.

In the second phase of the checking sequence, after the performance of the usual parity tests, network $LC_{II}$ energizes its leads 32a, 32e and 32f to transmit to network $LC_{II}$ the contents of memory section B1 in row No. 1, identified by the setting of its counter CR, by way of gates P8 and P16 as well as lead $20_{II}$. The address code thus read out from memory B of unit $ED_{II}$ arrives at gate P3 of unit $ED_I$ where, upon energization of lead 32k, it reaches the input lead 28 of computer CFR. The concurrent energization of leads 32a and 32f in unit $ED_I$ delivers the corresponding address code of the local memory B to input lead 29 of comparator CFR. In the presence of an enabling signal of lead 32n, the comparator indicates via lead 15i to controller LMP of circuit $LP_I$ whether or not the two address codes are identical.

In an analogous manner, the contents of memory sections B2 (empty at this point), B3 B4 are compared in subsequent phases by the energization of leads 32g, 32h and 32i to open the gates P9, P10 and P11 in both units $ED_I$ and $ED_{II}$, with additional energization of lead 32k in unit $ED_I$ and of lead 32e in unit $ED_{II}$ to open the gate P3 of the former and the gate P16 of the latter.

If all checks are positive, i.e. if no mismatch is detected, the microprogram removes the inhibition signal from lead $14_I$ whereupon an analogous checking sequence is carried out by network $LC_{II}$, with temporary enslavement of network $LC_I$. If that checking operation is also successful, the macroprogram continues normally. Each counter CR is advanced by one step, via lead 41 or 44, at the end of the respective checking sequence.

If, however, a disparity is ascertained by one or the other comparator CFR, an alarm condition is signaled via the corresponding lead 50 to the respective computer which thereupon may start a retest with regression to the end of the preceding cycle as more fully described below.

Writing Cycle

In this instance a macroinstruction "extract old data word" is sent to memory MIF via leads 2 and 3, initiating a writing microprogram which again passes through a number of phases under the control of circuit LMF.

As before, an address code transmitted by the computer over lead 1 is stored on register RI and in memory section B1, in a row identified by the current setting of counter CW. Again, the energization of output lead 30 of decoder DRF reads out from the data store, at a location identified by the address transmitted to it from register RI via gates P5 and P15, a data word to be loaded into memory section B3 of the selected row.

Next, a macroinstruction "write new data word" from the computer appears on leads 2 and 3 while the word to be written is transmitted to gate P1 via lead 1. The opening of gate P1, by the energization of lead 16h, delivers that data word to connector 18 whence it is loaded into register RD whose control lead 16a is likewise energized. The concurrent energization of leads 16d and 16g enables the same data word to be inscribed in memory section B2 at the row indicated by counter CW.

Next, leads 16n and 16q are energized to open the gates P4 and P14 for the transmission of the contents of register RD via lead 25 to the data store. The simultaneous unblocking of gates P5 and P15 by the energization of leads 16i and 16k transmits the corresponding address from register RI to the store by way of lead 26. A microinstruction resulting in the energization of lead 30 causes the new data word to be written in the store at the designated address.

This operation concludes the data transfer and, as before, leads to an incrementation of the setting of counter CW. If no discrepancy is detected in the subsequent double checking operation, proceeding in the aforedescribed manner, counter CR is also stepped and the macroprogram continues.

If a disparity is discovered in memory section B1 or B2, for example, an alarm signal on lead 50 gives rise to a retesting instruction from the computer which reaches the circuit LF via leads 2 and 3, resulting in the following sequence of operations:

Energization of lead 16g first unblocks the row of memory B identified by counter CW. This is followed by the energization of leads 16r and 16k to unblock the gates P20 and P15 for the transmission of the address code from memory section B1 to the associated data store by way of lead 26. Concurrently therewith, leads 16s and 16q are energized to unblock the gates P10 and P14 for the transmission of the old data word from section B3 to the indicated store address. A writing instruction on lead 30 causes that old data word to be reinscribed in the store while counter CW is taken back one step by a signal on lead 32j.

If the retest again reveals a mismatch, the proceedings can be repeated with regression to earlier cycles inasmuch as all information relating thereto is still stored on the corresponding stage of memory B; counters CW and CR are stepped back, upon each regression, by suitable signals on leads 32j and 32m, respectively. Once the zero state is reached, no further retesting is possible and the processors will have to be checked out independently to determine the cause of malfunction. Alternatively, the independent check may be initiated after only one retest, without regression to a preceding cycle.

At the start of each macroprogram, the memory B of each operating unit is cleared by the associated computer via nonillustrated circuitry.

In regard to microprogram-control units LMF and LMP, reference may be made to an article in COMPUTER DESIGN of August 1969, pages 41–51, entitled *The Microprogram Control Technique For Digital Logic Design*, by Gilbert C. Vondling and Donald E. Waldecker.

I claim:

1. In a data-processing system, in combination:

a pair of substantially identical data processors connected for parallel operation in the performance of a succession of operating cycles, ech data processor comprising a computer and a data store, said computer being provided with programming means establishing a succession of operating cycles, each cycle including a transfer operation and a checking operation;

a pair of substantially identical logic networks each inserted between the computer and the data store of a respective one of said data processors, each of said networks including memory means for the temporary registration of data called forth from and destined for the respective data store, each of said networks further including transfer means independent of said memory means connected to the respective computer and to the respective data store for transmitting data words therebetween during a transfer operation of any operating cycle;

comparison means for ascertaining the equality of information respectively registered in said memory means of said networks, said comparison means being provided with enabling circuitry rendered effective by the respective computer at the end of an operating cycle; and feedback means extending from said comparison means to the computers of said data processors for reverting to an earlier operating cycle upon ascertainment of a mismatch between the contents of the respective memory means of said networks;

each of said logic networks comprising a first counter for the counting of successive operating cycles and a second counter for the counting of successive checking operations, said counters having output connections extending to said comparison means for initiating a checking operation upon the count of said first counter exceeding that of said second counter.

2. The combination defined in claim 1 wherein said memory means includes a buffer memory with a multiplicity of stages identifiable by said first counter for loading during an operating cycle and by said second counter for readout during a checking operation.

3. The combination defined in claim 2 wherein each stage of said buffer memory is divided into a plurality of sections including a first section for receiving an address code indicating the location of a data word to be operated on, a second section for receiving a new data word to be written in said data store at the location indicated by said address code, and a third section for receiving an old data word read out from said data store at the location indicated by said address code, said transfer means being controllable by the respective computer for reintroducing an old data word from said third section into the respective data store at the location indicated by said address code in response to a mismatch reported to said respective computer by said feedback means upon a writing of a new data word at said location in said data store.

4. The combination defined in claim 2 wherein said first counter is provided with input means for reducing the count thereof by one step in response to a mismatch detected by said comparison means.

5. The combination defined in claim 2 wherein said comparison means comprises a pair of comparators, one in each of said networks, each with two inputs for receiving information registered in the memory means of both networks.

6. The combination defined in claim 5 wherein the inputs of each comparator are respectively connectable to said first and second counters of the respective logic network for the initiation of a checking operation, said data processor further including inhibiting circuitry actuatable under the control of the comparator of either of said networks for blocking the comparator of the other of said networks during a checking operation initated by the first-mentioned comparator.

7. The combination defined in claim 2 wherein said output connections include a connection for transferring the count of said second counter of one of said networks to said second counter of the other of said networks in an initial phase of a checking operation.

8. The combination defined in claim 2 wherein each of said networks comprises first bus-connector means for incoming code words, second bus-connector means for outgoing code words, and register means for data words to be transmitted by said transfer means, said register being connected in parallel with said buffer memory between said first and second bus-connector means.

9. The combination defined in claim 1 wherein each of said networks comprises two substantially identical microprogramming units activatable by macroinstructions from the respective computer for emitting sequences of microinstructions to said transfer means and to said comparison means, respectively.

* * * * *